Aug. 26, 1969  T. R. FREDRIKSEN  3,463,985
CLOSED LOOP STEPPING MOTOR CONTROL SYSTEM
Filed June 10, 1965  3 Sheets-Sheet 1
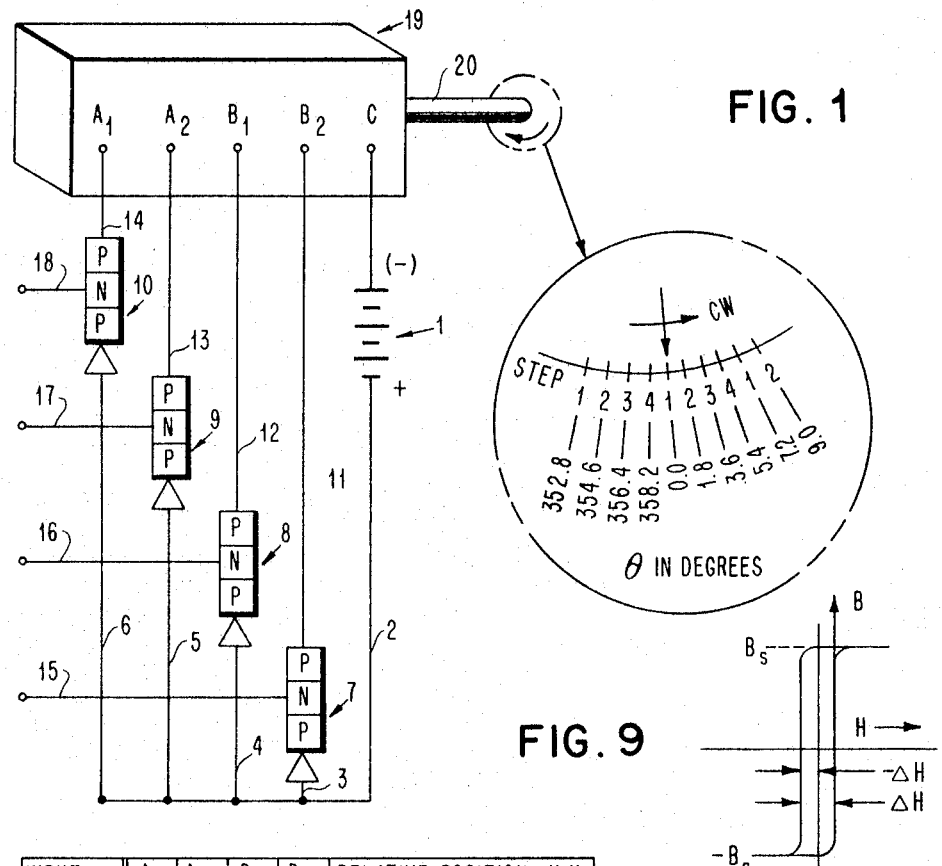
FIG. 1
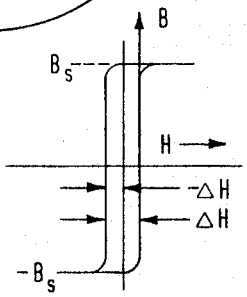
FIG. 9
$n = 0, 1, 2, \ldots\ldots 50$
FIG. 2
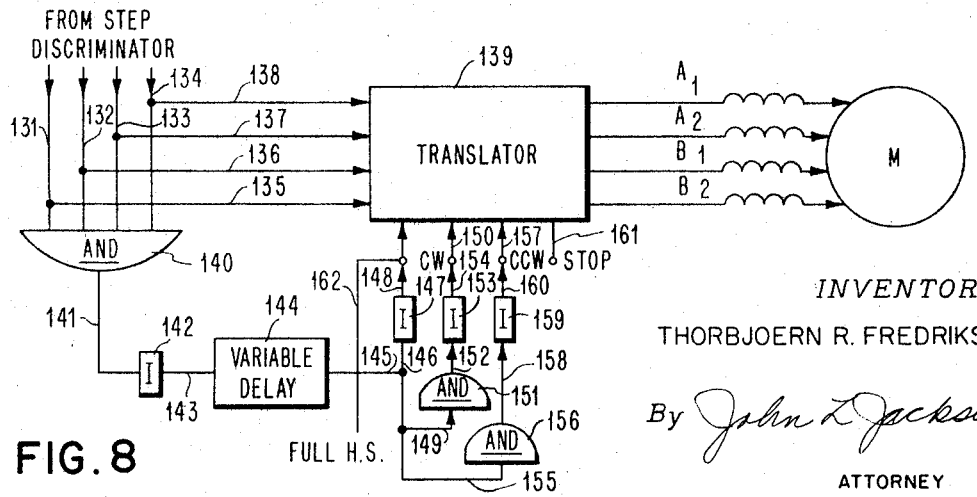
FIG. 8
*INVENTOR*
THORBJOERN R. FREDRIKSEN
By John L. Jackson
ATTORNEY

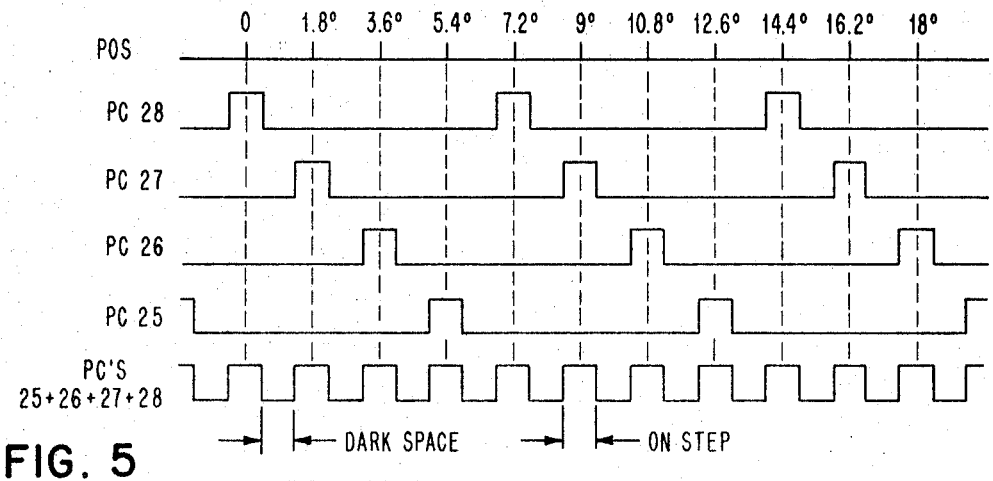
FIG. 5
FIG. 6
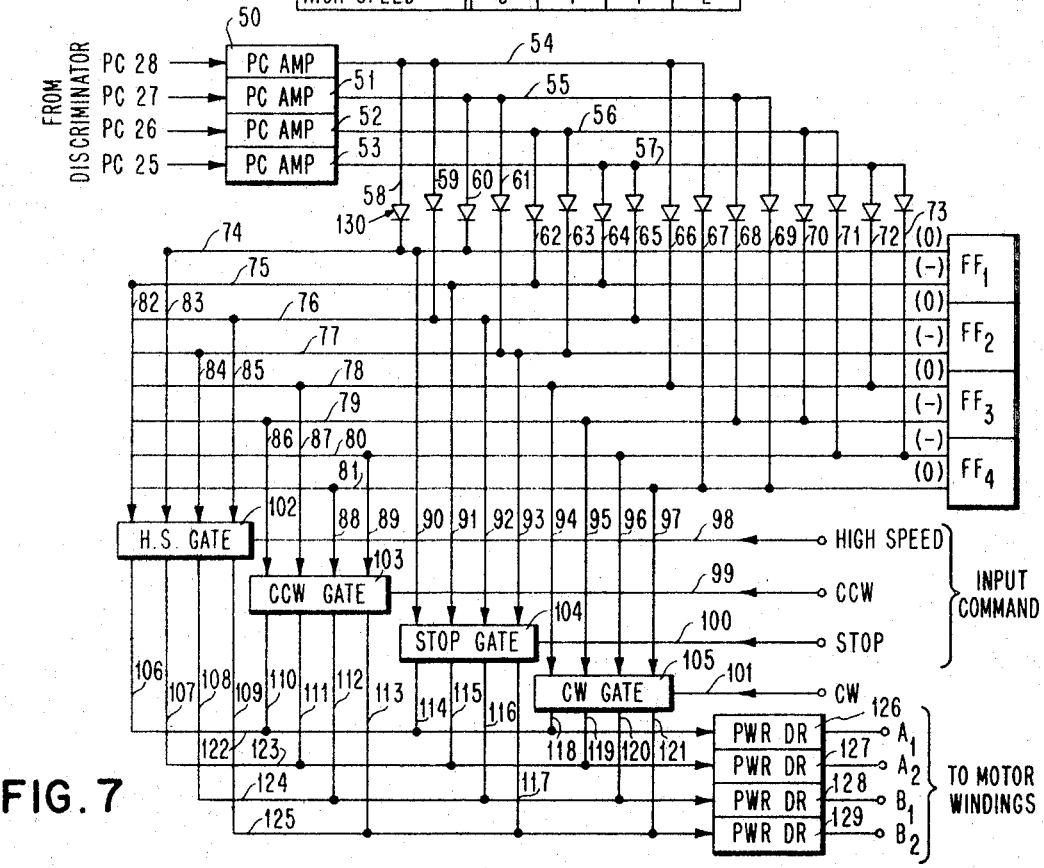
FIG. 7

United States Patent Office 3,463,985
Patented Aug. 26, 1969

3,463,985
CLOSED LOOP STEPPING MOTOR CONTROL
SYSTEM
Thorbjoern R. Fredriksen, Los Gatos, Calif., assignor to
International Business Machines Corporation, Armonk,
N.Y., a corporation of New York
Filed June 10, 1965, Ser. No. 462,955
Int. Cl. H02p 3/08, 5/06, 7/06
U.S. Cl. 318—138                                      8 Claims

ABSTRACT OF THE DISCLOSURE

A bi-directional stepping motor capable of variable, high speed bang-bang or synchronous operation. A step discriminator provides signals indicative of instantaneous rotor position. These are sent into a control circuit together with the input command signal. The output of the control circuit energizes the appropriate windings of the stepping motor such that the desired command is implemented irrespective of the instantaneous position of the motor shaft.

This invention relates to servomechanisms in general and more particularly to a servomechanism employing a stepping motor with rotor position feedback means for producing signals indicative of instantaneous rotor position and control means responsive to the position signals and input commands to energize appropriate windings of the stepping motor to provide bi-directional, variable high speed operation.

The theoretical aspects of time-optimal or bang-bang control have, in the last decade, been well documented. Indeed, the problem might well be considered solved from an academic or theoretical point of view. Actually, however, the conceptually simple theory still presents some rather severe basic problems when an attempt is made to implement it. This is primarily because the state space origin is particularly difficult to instrument since it is impossible to detect absolute zero quantities. In a practical system, the control problem is not terminated by driving the state vecor to the origin with a control input $u=\pm 1$, rather, the final control must be $u=0$. However, since the origin cannot be absolutely detected the result is invariably a limit cycle for a frictionless plant and a final error for a positional mechanism. In those applications where a high degree of accuracy is required, a secondary control mode different from the bang-bang control mode must therefore be applied in the state space region in the neighborhood of the origin. This type of dual mode control is relatively expensive and additionally, for a positional mechanism, a mechanical detent is often the only feasible solution. In addition to presenting control problems the mechanical detent is often sluggish thereby to a certain extent offsetting one of the main advantages of bang-bang control, i.e. high speed operation.

A motor presently available which has a mechanical accuracy sufficient for most positional mechanisms is a bifilar synchronous induction step motor. However, while possessing the requisite mechanical accuracy for most positional mechanisms the step motor in the the past has proved unsatisfactory for utilization in most servo applications since it has conventionally been operated as an open loop device. When a step motor is operated as an open loop device the load inertia can cause excessive overshoot and severely limit the maximum stepping rate. Additionally, load variations can distort the synchronized relationship between pulse input and motor stepping thereby causing the motor to miss one or more steps. Finally, practical stepping rates are low because the load sensitivity of the motor increases as a function of the stepping rate.

Ideally, for time-optimal bang-bang control, a bifilar synchronous induction stepping motor which inherently has a stable null zone with excellent positional accuracy should be utilized. Additionally, the control system for the stepping motor should be relatively insensitive to load inertia such that overshoot is prevented and maximum stepping rates are not affected. Also load variations should not force the motor to miss steps or lose torque, rather, the torque speed relation should be unaffected by the load. Likewise, practical stepping rates should be limited only by the winding L-R constant and the back EMF of the motor such that relatively high stepping rates are achieved. Finally, it would be highly desirable if the stepping motor could be operated at constant speeds which are selectable without varying the applied motor voltage.

It is therefore an object of the present invention to provide a novel closed loop stepping motor control system.

Another object of the present invention is to provide a servo control system employing a stepping motor to provide a stable null zone and consequent excellent positional accuracy.

Another object of the present invention is to provide a servo system employing a step motor the speed of which is limited only by the L-R constant and back EMF of the windings of the motor such that relatively high stepping rates are achieved.

Another object of the present invention is to provide a servo system employing a step motor which can be operated at various speeds without altering the applied voltage to the motor.

Another object of the present invention is to provide a servo system employing a step motor in which the load inertia does not affect maximum stepping rates and variations in load will not cause variations in the torque speed relation.

Other and further objects and advantages of the invention will be apparent from the following more particular description of the preferred embodiment of the invention, as illustrated in the accompanying drawings in which:

FIGURE 1 is a block-schematic illustration of a 200 step bifilar step motor;

FIGURE 2 is a table illustrating the relative rotational positions of the step motor shaft of the bifilar step motor of FIGURE 1 upon energization of the windings of the step motor;

FIGURE 5 is a chart illustrating the output of the step discriminator of FIGURE 4;

3

Figure 3A:
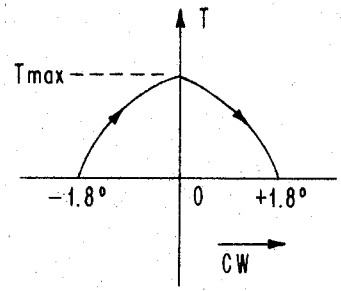
FIGURE 3A is a plot of steady state torque vs. shaft position provided with a steady state input energizing the step motor winding to cause it to rotate in the clockwise direction.
Figure 3B:
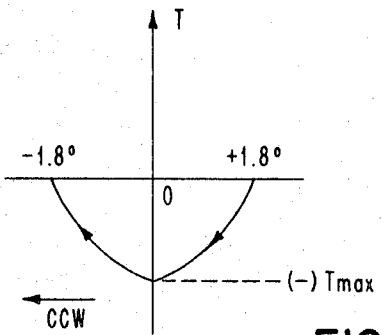
FIGURE 3B is a plot of steady state torque vs. shaft position with a steady state input energizing the windings of the step motor to cause it to move in a counterclockwise direction.
Figure 3C:
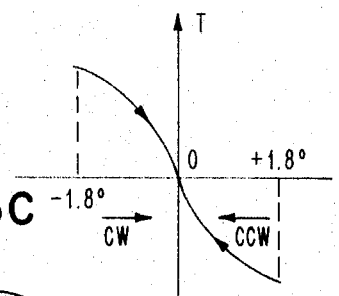
FIGURE 3C is a plot of steady state torque vs. shaft position with a steady state input applied to the windings of the step motor which coincides with the then position of the shaft such that a stop or lock condition occurs.
Figure 3D:
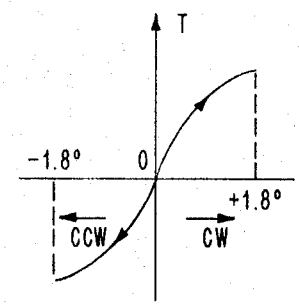
FIGURE 3D is a plot of the steady state torque vs. shaft position of the step motor when the steady state input is applied to the windings to cause it to operate in the high speed mode.

FIGURE 6 is a table illustrating the outputs provided by the translator to the motor windings with various input commands and various rotor positions;

FIGURE 7 is a schematic view of the translator;

FIGURE 8 is a diagram of the variable speed control which may be utilized in the subject servo system; and FIGURE 9 is a plot of the hysteresis characteristics of the poles of the stepping motor.

Briefly, in the subject novel servo system a conventional stepping motor is employed and connected to its rotor shaft is a step discriminator disk which is in optical association with light sources and photocells which provide signals indicative of the actual rotational position of the shaft. The output of the step discriminator is fed into a translator which also receives input or control commands. The translator translates the input commands of stop, clockwise, counterclockwise and high speed into potentials which are applied to appropriate windings of the step motor such that the desired command is implemented irrespective of the instantaneous position of the motor shaft. Additionally, in the high speed mode of operation the translator causes the motor to be energized so that the rotor will move towards a position located up to 2¼ steps away from the present rotor or shaft location rather than, as in the normal case, causing the motor to be energized so that the rotor will move towards a position one step away from present rotor position such that high speed operation is effected. Variable speed operation is provided in the high speed mode by varying the time of application of energizing potential to the motor windings such that the switch occurs after the rotor has moved toward the new location a certain amount such that the lead is less than 2¼ steps.

As was previously pointed out the stepping motor has become a widely used device in open loop control. This is due primarily to its digital behavior. However, only a fraction of the potential performance of a stepping motor is utilized in an open loop application since, in addition to its normal open loop oscillatory characteristics, severe limit restrictions exist as to stepping rates and load inertias. The former limitations are present because in conventional stepping motors the normal practice is to cause stepping by energizing the motor for a step adjacent to the present rotor location such that single steps are taken which result in a minimum amount of net torque being applied to the shaft. This is because torque optimization must be sacrificed to achieve reasonable rotational continuity and stability. The latter limitation is, of course, present in all open loop systems since the motor can slip a step or steps if no feedback of present shaft location is provided.

For a more detailed description, refer first to FIGURE 1 wherein is shown a block schematic diagram of a bifilar 200 step synchronous induction stepping motor. A more detailed description of this type of motor and its operating characteristics will be found in an article entitled "Characteristics of a Synchronous Inductor Motor" by Arthur E. Snowdon and Elmer W. Madsen, published in the March 1962 issue of Applications and Industry. $A_1$, $A_2$, $B_1$ and $B_2$ represent the four windings of the 200 step bifilar stepping motor. C represents the common return path which is connected to the negative side of a power supply generally designated at 1, the opposite or plus side of the power supply being connected along common line 2 to the emitters 3, 4, 5 and 6 of four solid state power switches generally designated at 7, 8, 9 and 10 respectively. The collectors 11, 12, 13 and 14 of the power switches 7 through 10 are connected, respectively, to the input side of motor windings $B_2$, $B_1$, A and $A_1$. Each of the solid state power switches 7 through 10 has an associated base 15 through 18, respectively, for causing the power supply 1 to be applied across its associated winding. The motor illustrated in block form at 19 has an output shaft 20 which through selective energization of the windings $A_1$, $A_2$, $B_1$ and $B_2$ through use of the power switches

4 can be caused to step in increments of 1.8°. Thus, one of four steps can be selected by energizing the windings. To provide 360° of operation, there must therefore be fifty groups of these four steps. As is conventional, a follow-up potentiometer or other similar device may be utilized to provide an indication as to at which of the 50 groups of four steps the output shaft is located. This rough feedback is assumed and is not part of the subject invention.

This 1 out of 50 rough positioning system is figuratively referred to as $n$. In FIGURE 2, there is shown a table which illustrates the various inputs and corresponding windings energized to provide a complete revolution. Thus, energization of windings $A_1$ and $B_1$ if the shaft is located at the 0° position, will yield a final shaft position of 0° plus $n$ times 7.2° since there are 7.2° in each of the 50 rough positions of the shaft. In this case, this input constitutes a stop command since the rotor is already at a $A_1$, $B_1$ or No. 1 type step and $n=0$.

Likewise, a type 2 input will energize windings $A_1$ and $B_2$ which will yield a shaft output position of 1.8° plus $n$ times 7.2° or 1.8° from home. Thus, four types of inputs 1 through 4 are provided such that in any one of the 50 coarse positions 4 discrete fine steps are located 1.8° apart which may be selected through energization of appropriate motor windings. This is the conventional method of operating a 200 step bifilar synchronous induction motor. The steps are located in a continuous sequence 4, 1, 2, 3, 4, 1, etc.; thus, the 4 operational inputs yield 200 discrete steady state shaft positions 1.8° apart. Again as previously pointed out to cause rotation of the shaft, the motor is energized for a step which is adjacent to the present shaft location. This adjacent step energization is repeated until the desired shaft position is reached.

From the above, it can be postulated that from a particular steady state shaft location there are only four possible input-output relations that can be initiated. For reasons which will hereinafter become more apparent these will be named and defined as follows: stop, windings corresponding to present shaft location are energized; clockwise, the motor is energized to move to a step located 1.8° in a clockwise direction; counterclockwise, the motor is energized to move to a step located 1.8° in a counterclockwise direction; high speed, the motor is energized by a step located roughly 3.6° in either direction.

Each of these input commands has a distinct torque vs. shaft position relation. Assuming the input has reached a steady state, the torque applied to the shaft on a stationary basis is shown qualitatively in FIGURES 3A, 3B, 3C and 3D.

From a consideration of the illustrations 3A through 3D it can be seen that both a stop and a high speed input give ideally zero torque for zero displacement; however, while the stop position will counteract any attempt to move the shaft, a similar disturbance toward either side in the high speed mode will cause the shaft to move two steps in the direction of the disturbance. Thus, in order to initiate a desired motor action, it is only necessary that the present step number that the shaft is occupying be available. Further, if this information is made continuously available by closing the minor loop and used to change the input accordingly, continuous motor action will occur. The purpose of the minor loop is to provide a piece-wise continuous operation of the step motor according to the four basic modes of operation set forth above. In general, the system must contain in addition to the step motor, a step discriminator and a logic unit which is capable of making control decisions based on both a binary type feedback and the input command. The minor loop can be instrumented in various ways; however, one method of implementing it which has proved extremely satisfactory is illustrated in FIGURE 4.

Figure 4:
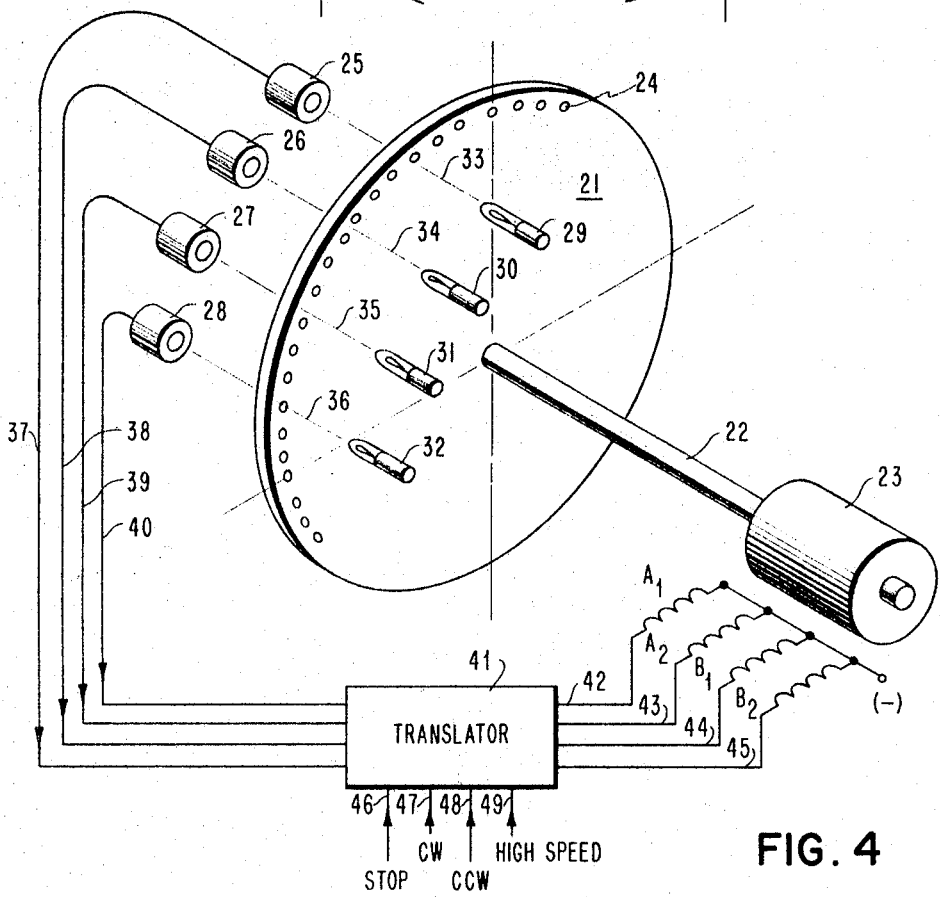
FIGURE 4 is an illustration of a step discriminator as utilized in the subject system to provide a signal indicative of instantaneous rotor location which signal includes information as to whether the rotor is at one of the 200 steps, and if so, which one of the four different type steps.

In FIGURE 4, a step discriminator is shown which detects present rotor position whether the motor is moving or at rest. A thin opaque disk 21 is fixedly attached to the shaft 22 of a step motor 23. Fifty small openings or transparent holes 24 are spaced 7.2° apart and are located equidistant from the axis of rotation of the disk. Four photo-transistors 25, 26, 27 and 28 with associated light sources 29, 30, 31 and 32 respectively are located 23.6° apart and their optical axes 33, 34, 35 and 36 pass through the holes 24 as the disk 21 is rotated. The disk 21 is attached relative to the shaft 22 such that when the motor 23 is energized by a type 1 input the optical axis 36 of the light source 32 and photo-transistor 28 passes through a hole in the disk indicating that the shaft 22 is at step 1. During this type 1 input as depicted in FIGURE 4, none of the other light source photo-transistor combinations are in optical communication through the disk since the opaque portion of the disk is interposed between each of the optical paths. Thus, a unique indication that the shaft is at a position corresponding to a type 1 input is provided. An indication that the rotor is at positions or steps corresponding to inputs 2, 3 and 4 is also uniquely available due to the inneraction between the positions of the holes in the disk and the spacing of the light source photocell pairs. Thus, for instance, rotation of the disk 21 in a clockwise direction for one step or 1.8° would cause the optical axis 35 of light source 31 and phototransistor 27 to pass through a hole 24 such that they would be in optical association and photo-transistor 27 would be energized indicating that the shaft 22 is at step 2. At the same time then the optical axis 36 of light source 32 and photo-transistor 28 would fall on an opaque area of the disk 21 and optical communication would not be established. Further rotation of the disk 21 in the clockwise direction for 1.8° would cause the optical axis 34 of light source 30 and photo-transistor 26 to pass through a hole 24 in the disk 21 which would indicate that the shaft is at step 4 and finally the next 1.8° rotation in the clockwise direction would cause the optical axis 33 of light source 29 and photo-transistor 25 to pass through a hole in the photocell indicating step 4.

Each of the photo-transistors 25 through 28 is connected by a line 37 through 40, respectively, to a translator 41 which in turn has its output fed along lines 42 through 45 to motor windings $A_1$, $A_2$, $B_1$ and $B_2$, respectively. Thus, energization of line 42 and its associated winding $A_1$ and line 44 and its associated winding $B_1$, as illustrated in the table of FIGURE 2, constitutes a type or step 1 input. Four input lines 46, 47, 48 and 49 also input into the translator 41. As shown in FIGURE 4, line 46 constitutes the stop line; line 47 is the clockwise line; line 48 is the counterclockwise line; and line 49 is the high speed line.

As previously stated, the step discriminator provides a unique indication of the actual position occupied by the shaft 22 of the motor 23. The uniqueness is further demarcated by making the light sensing interval equal to a half-step thereby leaving a 0.9° "dark space" between each adjacent step indication. The waveforms of FIGURE 5 illustrate the output of the step discriminator. The sum of the four signals is also illustrated since this quantity is necessary for the synchronous speed mode hereinafter described.

In operation, the step discriminator is rotated into one of the four step positions by the motor 23 which for purposes of illustration will be as shown in FIGURE 4. Thus, it will be assumed to be initially at step 1 in which case the optical axis 36 of light source 32 and photo-transistor 28 passes through one of the holes 24 on the disk 21. When this occurs photo-transistor 28 provides an indication along line 40 to the translator 41 that this is the actual position occupied by the shaft 22 of the motor 23. The translator 41, which will hereinafter be described in detail in connection with FIGURE 7, accepts this indication from the step discriminator and combines it with the particular command input received and translates these two inputs to appropriate signals on lines 42, 43, 44 and 45 to cause the step motor 23 to operate in accordance with the input command. Assume for purposes of illustration that the input command is a stop command. In this case, since as shown in FIGURE 4, the disk 21 occupies a position such that the optical axis 36 of the light source 32 and photo-transistor 28 passes through a hole 24 indicating that the motor 23 is at a step 1, the translator 41 will provide an input signal to the windings such that $A_1$ and $B_1$ are energized and the motor 23 will not step but be magnetically held. Likewise, the translator 41, if a clockwise input is received will furnish a signal to energize windings $A_1$ and $B_2$ to cause the motor to step one step in the clockwise direction. If a counterclockwise input had been received by the translator 41, by reference to FIGURE 2, windings $A_2$ and $B_1$ would have been energized to cause the motor 23 to step one step in the counterclockwise direction. The operation of the translator to effect proper energization of the windings to accomplish the above and to cause high speed operation will hereinafter be described in greater detail.

FIGURE 6 is a table illustrating the translator output to the motor relative to various motor inputs provided with the various input commands. Thus, from a consideration of FIGURE 6 if the step discriminator output indicates that the rotor is positioned at step 1, a stop input command would generate a type 1 motor input while if the step discriminator is indicating that the rotor is at step 1 a go clockwise command would yield a type 2 motor input while a high speed input command would yield a type 3 motor input. The reason for this two step skip in the high speed mode will hereinafter be described in more detail. Considering further the table of FIGURE 6, it can be seen that if the step discriminator provides an indication that the rotor is residing at step 3, a go clockwise command will yield a type 4 motor input.

From a consideration of the table in FIGURE 2, it can be seen that motor input for step 3 is the inverse of motor input for step 1 and the input for step 4 is the inverse of that for step 2. This inverseness is utilized in the translator shown in FIGURE 7. In FIGURE 7, the outputs of the discriminator, i.e., from photocells 28, 27, 26 and 25, are individually fed into and amplified by photocell amplifiers 50 through 53 respectively. The outputs from the photocell amplifiers 50 through 53 are fed along output lines 54 through 57 respectively. Four flip flops FF1, FF2, FF3 and FF4 are utilized in the translator and include input-output lines 74 through 81. With respect to the flip flops, it will be noted that in FIGURE 7 they are shown such that the input to the flip flop also constitutes the output. This is done merely for simplification of the drawing and it will, of course, be understood by those skilled in the art that FF1 through FF4 are conventional type flip flops such that assuming logical levels of zero and a minus potential that an input of zero to the flip flop will cause an associated output line to be zero and the opposite output line to assume a negative potential. The flip flops will stay in this state until energized in an opposite manner through application of potential to the input lines. The photocell amplifier output lines 54 through 57 are connected as shown in FIGURE 7 through isolating diodes 130 to the input-output lines of flip flops FF1 through FF4 by means of lines 58 through 73. The input-output lines of flip flops FF1 through FF4 are also connected to gates 102, 103, 104 and 105 by lines 82 through 97. Gates 102 through 105 provide outputs along lines 106 through 121 into four power drivers 126 through 129 by means of lines 122 through 125.

Gate 102 receives an input from the input control such that in the event of a high speed command it is activated along line 98 to cause the input to gate 102 to be fed along its output lines 106 through 109 into the power drivers 126 through 129 which as shown in FIGURE 7 are connected to the motor windings $A_1$, $A_2$, $B_1$ and $B_2$. Likewise, gate 103 is activated along line 99 by the counterclockwise input command while gate 104 is energized by the stop command along line 100 and gate 105 is activated along line 101 by the clockwise input command.

For purposes of operational description, assume that photocell 28 of the step discriminator is activated such that the output of the photocell amplifier 50 and line 54 is at zero potential. In this case, the other output lines 55, 56 and 57 from photocell amplifiers 51, 52 and 53 will be at a negative potential. The potential appearing on line 54 from photocell amplifier 50 passes through the isolating diode onto line 74 which causes FF1 to be set to cause its output lines to have potentials, as shown in FIGURE 7 of zero and minus. Likewise, the zero potential applied to line 54 passes along line 59 through the isolating diode to set FF2 as shown and the zero potential is fed along line 66 through the isolating diode to cause FF3 to be set as shown. Finally, the zero potential is fed through the isolating diode along line 67 to cause FF4 to be set as indicated. FF1 through FF4 will remain in the state in which they are set until energized by another input signal from the photocell amplifiers. Thus, line 74 and line 83 connected thereto will remain at zero potential such that at the input of gate 102 a zero potential is applied thereto along line 83. Likewise, line 76 from FF2 is at zero potential and therefore a zero potential is applied along line 85 to another input of gate 102. In like manner, lines 87 and 88 which are input lines to gate 103 will have a zero potential applied thereto; input lines 90 and 92 which are input lines to gate 104 will have zero potential applied thereto; and, input lines 94 and 97 which are input lines to gate 105 will have a zero potential applied thereto.

The activation of photocell 28, as previously stated, is indicative that the rotor of the step motor is occupying step 1. In this case, as previously explained, in the event that a stop input command is applied along line 100 to the translator the motor windings must be energized such that the rotor is locked and does not move. Considering gate 104, it can be seen that the zero potentials will be applied along line 114 and thence along line 122 to the input of power driver 126 which energizes winding $A_1$ and along line 116 and thence along line 124 to the input of power driver 128 which energizes winding $B_1$. Thus, in the event that a stop input command is fed into the translator while photocell 28 is energized indicating that the rotor is at step 1 windings $A_1$ and $B_1$ would be energized which, referring to the table of FIGURE 2, is a type 1 input. Thus, the rotor would not move and would be magnetically locked into position. In like manner assuming that the rotor is occupying step 1 and a clockwise command is fed along line 101 to gate the input lines from the flip flops into the power drivers, lines 118 and 122 would be connected to power driver 126 thereby energizing winding $A_1$ and lines 121 and 125 would pass the zero potential into power driver 129 thereby energizing winding $B_2$ which again referring to the table of FIGURE 2 is the proper winding to be energized such that the rotor will move into a step 2 position. The same is true of energization of windings 98 and 99 which are the inputs to the high speed gate 102. As the output from the step discriminator applied into the photocell amplifiers 50 through 53 varies thereby resetting flip flops FF1 through FF4, application of energizing or gating potentials along lines 98 through 101 from the input command source will cause the gates 102 through 105 to pass appropriate signals such that the correct windings of the motor are energized.

In the normal utilization of bifilar synchronous induction step motors energization of the windings to accomplish stepping is sequential with the steps in the direction of desired rotation, adjacent to the previously energized motor step taking place such that the net torque causes rotation of the motor. Obviously, the speed of the rotor is limited with this adjacent type energization of windings because of various delays within the motor such as hysteresis. In the present system once the direction of movement of the rotor has been established by selection of a counterclockwise or clockwise input command the motor can be switched into the high speed mode of operation wherein as shown in the table of FIGURE 6, the motor is energized for steps located 2¼ steps away from present rotor position such that the delayed torque still appears in time to give a relatively large net torque in the desired direction.

An analysis of the high speed operation will be given. Due primarily to the hysteresis effect in the soft steel portions of the rotor and the stator, the torque is not developed in phase with the step function input to the windings. Considering the hysteresis loop to be rectangular as shown in FIGURE 9, it will take a certain change $-\Delta H$ in the magnetic intensity to reverse the magnetization from $+B_s$ to $-B_s$ and a change $\Delta H$ to change from $-B_s$ to $+B_s$ over and beyond dropping H to zero. However, the magnetic intensity is a function of current in the respective windings which in turn is time dependent due to the inductance and therefore $$H = H(t)$$

and it takes a $\Delta t$ to establish $\Delta H$ (or $-\Delta H$). During this time delay $\Delta t$ the rotor is moving and it is entirely possible that it could reach the magnetic center for which the change in magnetization is intended to produce torque. The net result is little or no effective torque for acceleration. By changing the magnetization earlier with respect to position, it is possible for the rotor to attain a higher speed before reaching the zero average torque condition. Likewise, if the magnetization is changed later, torque will be developed in the reverse direction thereby decelerating the rotor.

Pending a more detailed and mathematically sound analytical investigation, it is suggested that for most stepping motors of the type described, the 2¼ step lead as far as winding energization is concerned is sufficiently large so that $$W_s \cdot \Delta t < \frac{2.25 \times 2\pi}{200}$$

where $W_s$ is steady state speed due to back EMF, inductance and friction forces.

Secondly, there exists a range of leads between 1.25 and 1.75 steps where $$W_s \cdot \Delta t \approx \frac{2.25 \times 2\pi}{200}$$

where $W_s$ is the so called synchronized speed which is dependent upon the lead of magnetization and the slip caused by frictional forces $$W_s = f(l, f)$$

Experimental results substantiate this theory. For example, when a stepping motor running clockwise at high speed is switched into the clockwise mode, the rotor will decelerate sharply until the low synchronized speed is reached and locks in.

The high speed acceleration characteristic is similar to a velocity saturated D.C. motor while the variable synchronized speed torque characteristic closely resembles that of a three phase inductive motor.

Again, as previously stated if the rotor were at rest and a winding two positions away from present rotor position is energized, the direction of movement of the rotor is unpredictable. The rotation of the motor must therefore first be established in the desired direction prior to switching into the high speed mode of operation.

From a consideration of the system of FIGURE 7, it will also be apparent that as the output shaft of the step motor rotates that the status of the flip flops FF1 through FF4 will continually change such that in the high speed mode a winding located 2¼ steps away from present rotor location will continuously be energized such that the high speed mode of operation is carried through.

Refer next to FIGURE 8 wherein is shown a block diagram of a system which is operable to provide variable speeds in the high speed mode of operation. In FIGURE 8 as shown, input lines from the step discriminator 131 through 134 are fed into an inverting AND gate 140 and likewise fed along lines 135 through 138 into a translator 139 which has its output operably connected to the windings of the step motor. The output of AND gate 140 is fed along line 141 through an invertor 142 and thence along line 143 to a variable delay 144. The output of the variable delay 144 is fed along line 145 to line 146 which is connected to an invertor 147 the output of which is fed along line 148 to translator 139. A full high speed line 162 is also connected to line 148. Likewise, line 146 is connected to line 149 which constitutes one input to an inverting AND gate 151 the other input of which is connected to the clockwise command input along line 150. The output of AND gate 151 is fed along line 152 through an invertor 153 and line 154 into the translator 139. Line 146 is also connected along line 155 which constitutes one input to an inverting AND gate 156 which receives its other input from the counterclockwise command input along line 157. The output of AND gate 156 is taken along line 158 through an invertor 159 and thence along line 160 to the translator 139. A stop input to the translator is applied along line 161.

In operation when the step motor is at rest, the output of the AND gate 140 taken along line 141 is at a negative potential since all of the inputs applied along lines 131 through 134 are not equal. This is because one of the photocells is sensing light and consequently one of the lines 131 through 134 will have a zero potential applied to it while the other three lines will be at a negative potential. In this case, for purposes of illustration, the output of AND gate 140 when inverted by the invertor 142 appears as a zero potential on lines 143, 145, 146, 149 and 155. Assuming that the clockwise line is energized with a zero potential applied to line 150, the AND gate 151 will provide a negative output to line 152 which when inverted in invertor 153 results in a zero potential being applied to the translator 139 along line 154. Thus, the clockwise gate will be energized in the translator such that the clockwise mode of operation is entered into. The motor will therefore begin to rotate in a clockwise direction. Line 148 at this time will have a negative potential applied to it due to the inversion of the zero potential on line 146 in the invertor 147 and, likewise, line 160 will have a negative potential applied to it since, with a negative potential applied to AND gate 156 along line 157 the output on line 158 is zero which when inverted in invertor 159 results in a negative potential on line 160.

When the step discriminator had moved a small distance, as previously stated, "dark space" is encountered such that the inputs applied to the AND gate 140 along lines 131 through 134 will be negative, the input of the AND gate will go to zero which when inverted in the invertor 141 appears as a negative potential on lines 143, 145, 146, 149 and 155. With this negative potential on line 149, the output of AND gate 151 on line 152 goes to zero and the clockwise input to the translator goes to a negative potential thereby disabling the clockwise gate in the translator. At the same time the negative potential on line 146 is inverted in invertor 147 and applied to the high speed line 148 to cause the translator to go into the high speed mode. The variable delay 144 is used to control the duration that the negative potential is applied to line 146. If the application of the negative potential to line 146 is delayed until the "dark space" time has almost completely elapsed, the speed of the motor will be only slightly above normal operation whereas application of the negative potential near the beginning of the "dark space" will greatly increase the speed of operation of the motor. Any number of speeds can thus be selected by varying the time of application of the zero potential to line 146. The range of available speeds can be increased. In the case herein illustrated, the dark space is ½ step or 0.9°. As a practical matter, its field of view can be more confined thereby providing more dark space. Thus, the dark space can be made to appear after the rotor has moved ¼ step in the direction commanded.

It should be apparent from the foregoing that the high speed mode of operation, as affected by the variable delay will be automatically entered into. Likewise, the stop input is used for deceleration and magnetic detenting.

The variable delay has not been discussed in detail since its particular configuration is not important. Any one of several types of variable delays, such as a single shot, can be used. Likewise, the external servo control which controls application of potential to the input control lines to cause clockwise, counterclockwise, stop and high speed operation is not included. This decision making through velocity, error and other input and feedback information to utilize the present system is not part of the invention.

In summary, in the subject novel servo system a conventional stepping motor is employed and connected to its rotor shaft 22 is a step discriminator disk 21 which is in optical association with light sources 29 through 32 and photocells 25 through 28 which provide signals indicative of the actual rotational position of the shaft. The output of the step discriminator is fed into a translator 41 which also receives input or control commands. The translator translates the input commands of stop, clockwise, counterclockwise and high speed into potentials which are applied to appropriate windings of the step motor such that the desired command is implemented irrespective of the instantaneous position of the motor shaft. Additionally, in the high speed mode of operation the translator causes the motor rotor to seek a step located up to 2¼ steps away from the present rotor or shaft location rather than, as in the normal case, causing the motor to be energized for a position located one step away from present rotor location such that high speed operation is effected. Variable speed operation is provided in the high speed mode by varying the time of application of a change in energizing the motor windings such that it becomes effective after the rotor has moved toward it a certain amount such that the lead is less than 2¼ steps but more than 1 step, or in the illustrative case of a ½ step dark space, the lead is less than 1¾ but more than 1¼ steps.

There has therefore been provided for a time optimal band-bang control a bifilar synchronous induction step motor which inherently has a stable null zone with excellent positional accuracy. Additionally, the control system for the step motor is relatively insensitive to load inertia such that maximum stepping rates are not affected and load variations do not force the motor to miss steps or lose torque, rather the torque-speed relation is unaffected by the load. Likewise, practical stepping rates are limited only by the winding L–R constant and the back EMF such that relatively high stepping rates are achieved. Finally, the stepping motor can be operated at a constant speed which is adjustable without varying the applied voltage.

While the invention has been particularly shown and described with reference to a preferred embodiment thereof, it will be understood by those skilled in the art that various changes in the form and details may be made therein without departing from the spirit and the scope of the invention.

What is claimed is:

1. A closed loop stepping motor control system to which input commands are supplied from an external servo control, said system comprising:
    a stepping motor including a rotor shaft and a plurality of windings which may be selectively energized to cause said rotor shaft to rotate in either a clockwise or counterclockwise direction,
    opto-electrical means for generating signals representative of the rotational position of said shaft, and
    means receptive of said representative signals and said input commands operable thereon to initially energize a step winding one step away from rotor location in the direction commanded and thereafter to energize a step winding located substantially 2¼ steps away from present rotor location.

2. A closed loop stepping motor control system to which input commands are supplied from an external servo control, said system comprising:

a stepping motor including a rotor shaft and a plurality of step windings which may be selectively energized to cause said rotor to rotate in either the clockwise or counterclockwise direction, a disk mounted on said rotor shaft including means which are in optical association with fixed opto-electrical means such that signals are generated representative of the rotational position of said shaft, said signals including information relative to when said rotor corresponds to a step and when said rotor is between steps, and means receptive of said representative signals and said input commands operative to supply energizing potentials to said step windings to cause said rotor to rotate in a direction in accordance with said input commands by initially energizing a step winding one step away from present rotor location in the direction commanded and thereafter energizing step windings located substantially 2¼ steps away from present rotor location.

3. A closed loop stepping motor control system to which input commands are supplied from an external servo control, said system comprising:

a stepping motor including a rotor shaft and a plurality of step windings which may be selectively energized to cause said rotor to rotate in either the clockwise or counterclockwise direction.

a disk mounted on said rotor shaft including means which are in optical association with fixed opto-electrical means such that signals are generated representative of the rotational position of said shaft, said signals including information relative to when said rotor corresponds to a step and when said rotor is between steps, means receptive of said representative signals and said input commands operative to supply energizing potentials to said step windings to cause said rotor to rotate in a direction in accordance with said input commands by initially energizing a step winding one step away from present rotor location in the direction commanded and thereafter energizing step windings located up to 2¼ steps away from present rotor location, and means operable after said rotor has moved substantially ¼ step in the direction commanded operable to vary the time of energization of the windings located 2¼ steps away from the said present rotor location to thereby provide variable speed.

4. A closed loop stepping motor control system to which input commands are supplied from an external servo control, said system comprising:

a stepping motor including a rotor shaft and a plurality of windings which may be selectively energized to cause said rotor shaft to rotate in either a clockwise or counterclockwise direction, means for generating signals representative of the rotational position of said shaft, and means receptive of said representative signals and said input commands operable thereon to initially energize a step winding one step away from rotor location in the direction commanded and thereafter to energize a step winding located substantially 2¼ steps away from present rotor location, 5. The closed loop stepping motor control system of claim 4 additionally comprising means operable after said rotor has moved substantially ¼ step in the direction commanded operable to vary the time of energization of the windings located 2¼ steps away from the said present rotor location to thereby provide variable speed.

6. A closed loop stepping motor control system to which input commands are supplied from an external servo control, said system comprising:

a stepping motor including a rotor and a plurality of step windings, which step windings may be selectively energized to establish, after a time delay, one of a plurality of force vectors; which force vectors, relative to a stationary rotor, correspond to various rotor torque values: first force vectors corresponding to positive torque, second force vectors corresponding to negative torque, a third force vector corresponding to stable zero torque, and a fourth force vector corresponding to unstable zero torque;

means for generating signals representative of the rotational position of said shaft;

control means responsive to said input commands and said representative signals for energizing said step windings to implement high speed movement;

said control means including initiating means and high speed control means;

said initiating means operative to supply energizing potential to step windings corresponding to said first force vectors;

said high speed control means operative to supply energizing potentials to step windings selected from those step windings corresponding to said second and fourth force vectors and which, after said time delay, establish a positive torque with respect to said rotor.

7. A closed loop stepping motor control system to which input commands are supplied from an external servo control, said system comprising:

a stepping motor including a rotor and a plurality of step windings, which step windings may be selectively energized to establish, after a time delay, one of a plurality of force vectors; which force vectors, relative to a stationary rotor, correspond to various rotor torque values: first force vectors corresponding to positive torque, second force vectors corresponding to negative torque, a third force vector corresponding to stable zero torque, and a fourth force vector corresponding to unstable zero torque;

means for generating signals representative of the rotational position of said shaft;

control means responsive to said input commands and said representative signals for energizing said step windings to implement high speed and variable high speed rotor movement;

said control means including initiating means, high speed control means, and variable speed control means;

said initiating means operative to supply energizing potential to step windings corresponding to said first force vectors;

said high speed control means operative to supply energizing potentials to step windings selected from those step windings corresponding to said first, second, and fourth force vectors and which, after said time delay, establish a positive torque with respect to said rotor; and said variable speed control means selectively controlling the duration of energizing potential supplied to the step windings by said high speed control means.

8. A closed loop stepping motor control system to which input commands are supplied from an external servo control, said system comprising:

a stepping motor including a rotor shaft and a plurality of step windings which may be selectively energized to cause said rotor to rotate in either the clockwise or counterclockwise direction, means for generating signals representative of the rotational position of said shaft, said signals including information realtive to when said rotor corresponds to a step and when said rotor is between steps, means receptive of said representative signals and said input commands operative to supply energizing potentials to said step windings to cause said rotor to rotate in a direction in accordance with said input commands and to further cause said step windings to be energized during the time that said rotor is between steps to cause high speed operation of said motor, and adjustable variable speed means for varying the amount of time that said motor is in said high speed mode of operation during the time that said rotor does not correspond to a step.

References Cited

UNITED STATES PATENTS

| 3,096,467 | 7/1963 | Angus et al. | 318—254 XR |
| 3,324,369 | 6/1967 | Markakis | 318—138 |
| 3,345,547 | 10/1967 | Dunne | 318—138 |
| 3,353,076 | 11/1967 | Haines | 318—138 |
| 3,359,474 | 12/1967 | Welch et al. | 318—138 |

ORIS L. RADER, Primary Examiner

G. R. SIMMONS, Assistant Examiner

U.S. Cl. X.R.

318—254